(12) United States Patent
Lee et al.

(10) Patent No.: US 7,015,555 B2
(45) Date of Patent: Mar. 21, 2006

(54) MAGNETORESISTIVE RANDOM ACCESS MEMORY WITH HIGH SELECTIVITY

(75) Inventors: Kyung-jin Lee, Seoul (KR); Wan-jun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/751,886

(22) Filed: Jan. 7, 2004

(65) Prior Publication Data

US 2004/0188830 A1 Sep. 30, 2004

(30) Foreign Application Priority Data

Jan. 7, 2003 (KR) ...................... 10-2003-0000778

(51) Int. Cl.
*H01L 27/14* (2006.01)
(52) U.S. Cl. ...................... 257/414; 365/158; 365/173; 365/200; 365/209
(58) Field of Classification Search ................ 365/173, 365/158, 209, 200
See application file for complete search history.

(56) References Cited

U.S. PATENT DOCUMENTS

| | | | |
|---|---|---|---|
| 5,757,695 A | | 5/1998 | Shi et al. |
| 5,959,880 A | | 9/1999 | Shi et al. |
| 6,166,948 A | * | 12/2000 | Parkin et al. ................ 365/173 |
| 6,480,412 B1 | * | 11/2002 | Bessho et al. .............. 365/173 |
| 6,760,266 B1 | * | 7/2004 | Garni et al. ................ 365/209 |
| 2002/0039668 A1 | | 4/2002 | Inomata et al. |
| 2002/0117727 A1 | | 8/2002 | Engel et al. |
| 2003/0081467 A1 | * | 5/2003 | Nishimura |

OTHER PUBLICATIONS

J. Zhang et al, "Topological Coupling in Spin Valve Type Multilayers", IEEE Transactions on Magnetics, IEEE Inc., New York, vol. 32, No. 5, Sep. 1, 1996, pp. 4630-4635.
European Search Report for EP 04250030.6.

* cited by examiner

Primary Examiner—Mai-Huong Tran
(74) Attorney, Agent, or Firm—Buchanan Ingersoll PC (57) ABSTRACT

A magnetoresistive random access memory is provided. The magnetoresistive random access memory includes a first magnetic layer of which the direction of a magnetic vector is fixed, a second magnetic layer which is positioned in parallel with the first magnetic layer and of which the direction of a magnetic vector is reversible, and a nonmagnetic layer interposed between the first and second magnetic layers, the second magnetic layer having an aspect ratio of 2 or less, a thickness of 5 nm or less, and a saturation magnetization of 800 emu/cm$^3$ or less. The magnetoresistive random access memory has kink-free, magneto-resistance characteristics, thereby exhibiting high selectivity regardless of process capability.

17 Claims, 11 Drawing Sheets

MAGNETORESISTIVE RANDOM ACCESS MEMORY WITH HIGH SELECTIVITY

BACKGROUND OF THE INVENTION

This application claims the priority of Korean Patent Application No. 2003-000778, filed on Jan. 7, 2003, in the Korean Intellectual Property Office, the disclosure of which is incorporated herein by reference in its entirety.

1. Field of the Invention

The present invention relates to a magnetoresistive random access memory, and more particularly, to a magnetoresistive random access memory with high selectivity.

2. Description of the Related Art

A magnetoresistive random access memory (MRAM) is a spin electronic device that has been developed as a next generation memory device capable of replacing a conventional dynamic random access memory (DRAM) in which it has a fast data write speed but data stored inside is erased once an electric power is off, and a flash memory having a data write speed 1,000 times slower than the DRAM. The MRAM has a multilayer thin film structure of a ferromagnetic layer/an insulating layer/a ferromagnetic layer and stores data by controlling spin tunneling of electrons according to the magnetization direction of a magnetic material of the ferromagnetic layer.

Figure 1:
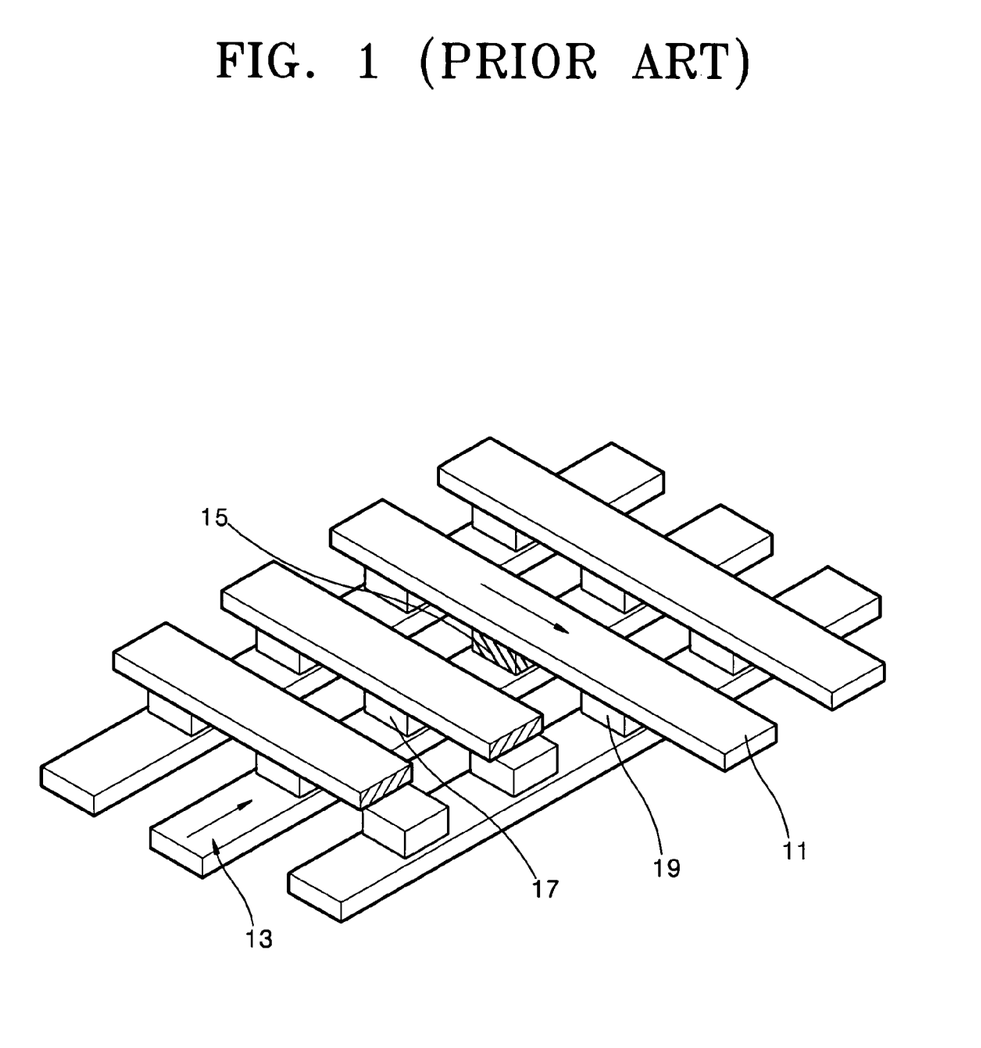
FIG. 1 is a fundamental structural view of conventional magnetoresistive random access memory (MRAM) cells.

FIG. 1 is a fundamental structural view of conventional MRAM cells. When an electric current is applied to both a bit line 11 and a word line 13, the magnetization direction of a free layer of a first cell 15 positioned at an intersection between the bit line 11 and the word line 13 is reversed. As a result, magnetic information is written on a magnetic memory bit. However, in an array of the MRAM, a magnetic field is unavoidably applied to second and third cells 17 and 19 that are respectively present on the word line 13 and the bit line 11 to which an electric current is applied.

Figure 2:
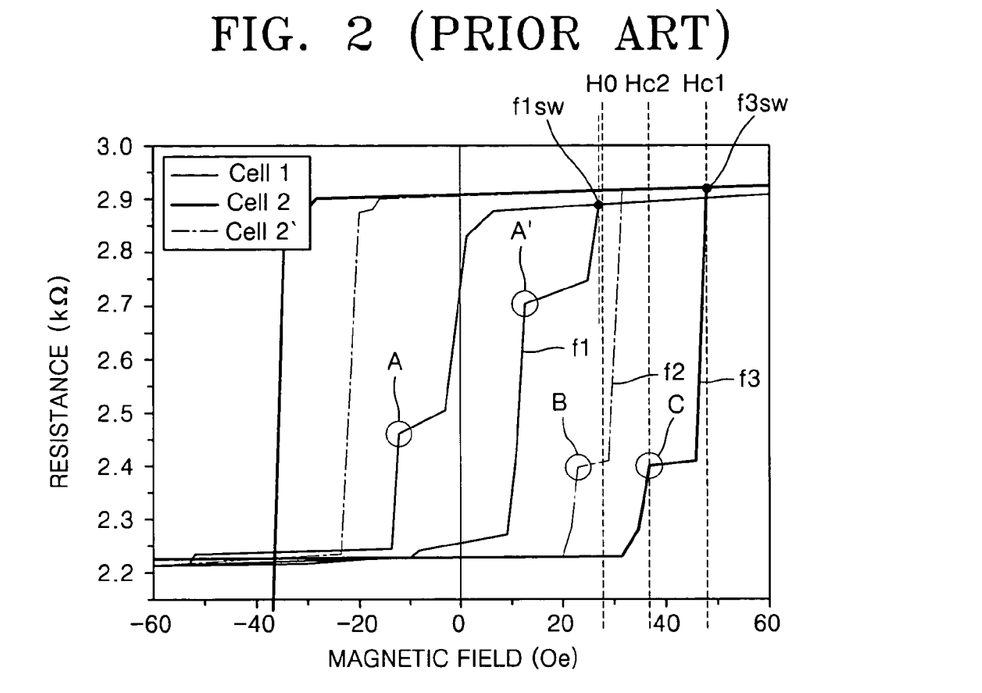
FIG. 2 is a graph showing resistance-magnetic field (R-H) characteristics of a first cell selected for writing and second and third cells positioned around the first cell, in the MRAM cells shown in FIG. 1.

FIG. 2 is a graph showing resistance-magnetic field (R-H) characteristics of the first cell 15 selected for data writing and the second and third cells 17 and 19 positioned around the first cell 15. Although the second and third cells 17 and 19 are not selected for data writing, a magnetic field is applied thereto.

f1 is a graph showing R-H characteristics of the first cell 15, f2 is a graph showing R-H characteristics of the third cell 19, and f3 is a graph showing R-H characteristics of the second cell 17. As can be seen from the f1, f2, and f3, there are two discrete states of R-H curves in conventional MRAM cells. Kinks, areas having resistance of an intermediate state to magnetic field, appear at points A and A' of the f1, a point B of the f2, and a point C of the f3. The kinks are one of main factors that decrease selectivity of an MRAM array.

The first cell 15 has a switching field H0 lower than neighboring cells due to an electric field applied from the bit line 11 and the word line 13 that are perpendicular to each other. In the graph of the f1, a magnetic field H0 for full switching is achieved at a point of f1sw. When a switching field H0 of 28 Oe is applied, while the direction of a magnetic vector in a free layer of the first cell 15 is reversed, the direction of a magnetic vector in a free layer of the second cell 17 on the word line 13 is not reversed. Referring to the f3, a kink (the point C) is created at a magnetic field, Hc2, larger than the H0. Therefore, the magnetization reverse of the second cell 17 does not take place. However, referring to the f2, a kink (the point B) is created at a magnetic field smaller than the H0. Therefore, when the magnetic field of H0 is applied, the magnetic vector of some magnetic domains of the third cell 19 on the bit line 11 is partially reversed, thereby causing an error.

Therefore, in order to increase selectivity of a MRAM, it is required that a MRAM cell is newly designed toward the direction of having no kinks or having kinks incapable of adversely affecting selectivity.

SUMMARY OF THE INVENTION

The present invention provides a magnetoresistive random access memory with high selectivity as a result of annihilation of kinks.

According to an aspect of the present invention, there is provided a magnetoresistive random access memory comprising: a first magnetic layer of which the direction of a magnetic vector is fixed; a second magnetic layer which is positioned in parallel with the first magnetic layer and of which the direction of a magnetic vector is reversible; and a non-magnetic layer interposed between the first and second magnetic layers, the second magnetic layer having an aspect ratio of 2 or less, a thickness of 5 nm or less, and a saturation magnetization of 800 emu/cm$^3$ or less.

The second magnetic layer may have an aspect ratio of 1.5 or less, preferably 1.4 or less, more preferably 1.3 or less, even more preferably 1.2 or less, still more preferably 1.1 or less, and most preferably 1.0 or less.

The second magnetic layer may have a thickness of 4 nm or less, and preferably 3 nm or less.

The second magnetic layer may have a saturation magnetization of 700 emu/cm$^3$ or less, and preferably 600 emu/cm$^3$ or less.

The first and second magnetic layers or the non-magnetic layer may be formed in a multilayer structure and the non-magnetic layer may be made of a conductive material.

According to the present invention, kinks are annihilated by forming a free layer with an aspect ratio of 2 or less, a thickness of 5 nm or less, and a saturation magnetization of 800 emu/cm$^3$ or less, which makes it possible to realize a high selective memory.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a magnetoresistive random access memory (MRAM) according to an embodiment of the present invention will be described with reference to the accompanying drawings.

In the present invention, in order to represent kinks as a numerical value, as shown in FIG. 2, a magnetic field required for full switching of an unselected predetermined cell is defined as Hc1 (created at a point f3sw in FIG. 2) and an initial magnetic field for creation of kinks is defined as Hc2. Hc2/Hc1 is used as a quantitative variable of kinks. Here, Hc2/Hc1 is equal to 1 indicates that there are no kinks at the resistance-magnetic field (R-H) curve of an MRAM cell.

Figure 3:
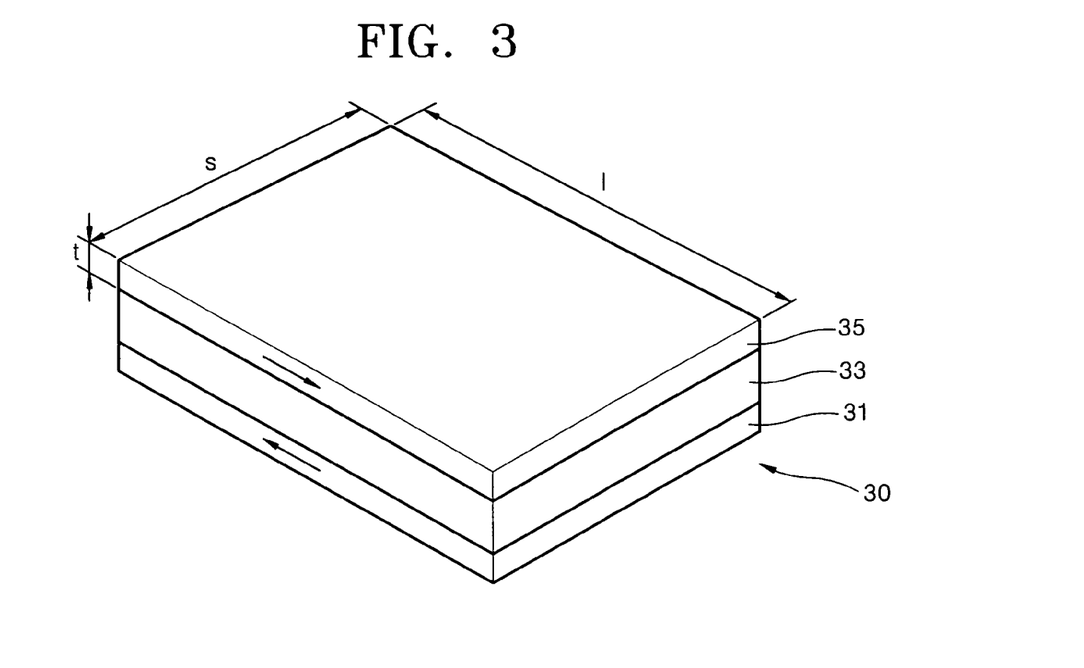
FIG. 3 is a schematic structural view of an MRAM cell according to an embodiment of the present invention.

FIG. 3 is a schematic structural view of an MRAM cell according to an embodiment of the present invention.

Referring to FIG. 3, an MRAM cell 30 according to an embodiment of the present invention has a stacked structure of first and second magnetic layers 31 and 35 made of a magnetic material and a non-magnetic layer 33 interposed between the first and second magnetic layers 31 and 35. One of the first and second magnetic layers 31 and 35 serves as a fixed layer in which the direction of a magnetic vector of magnetic domains is fixed. On the other hand, the other magnetic layer serves as a free layer in which the direction of a magnetic vector of magnetic domains is reversible by an applied magnetic field. For example, if the first magnetic layer 31 is a fixed layer, the second magnetic layer 35 is a free layer. In this case, the MRAM cell 30 is formed so that an aspect ratio (AR), the ratio of the length (l) of a major axis of a bit line direction to the length (s) of a minor axis of a word line direction is 2 or less, the thickness (t) and the saturation magnetization (Ms) of the second magnetic layer 35 as a free layer are 5 nm or less and 800 emu/cm$^3$ or less, respectively.

An MRAM cell according to an embodiment of the present invention may be formed with more than two magnetic layers. Similarly, in this case, kinks can be annihilated so long as the AR of a free layer is set to 2 or less, the t of the free layer to 5 nm or less, and the Ms of the free layer to 800 emu/cm$^3$ or less, which makes it possible to realize an MRAM cell with high selectivity.

FIGS. 4A through 4E are diagrams showing distribution of Hc2/Hc1 (HR) according to a thickness (t) and a saturation magnetization (Ms) of a free layer at a predetermined aspect ratio (AR). If the HR, a variable representing a minimum kink occurring filed ratio, is 0.7 or more, a memory with less kinks can be obtained.

Figure 4A:
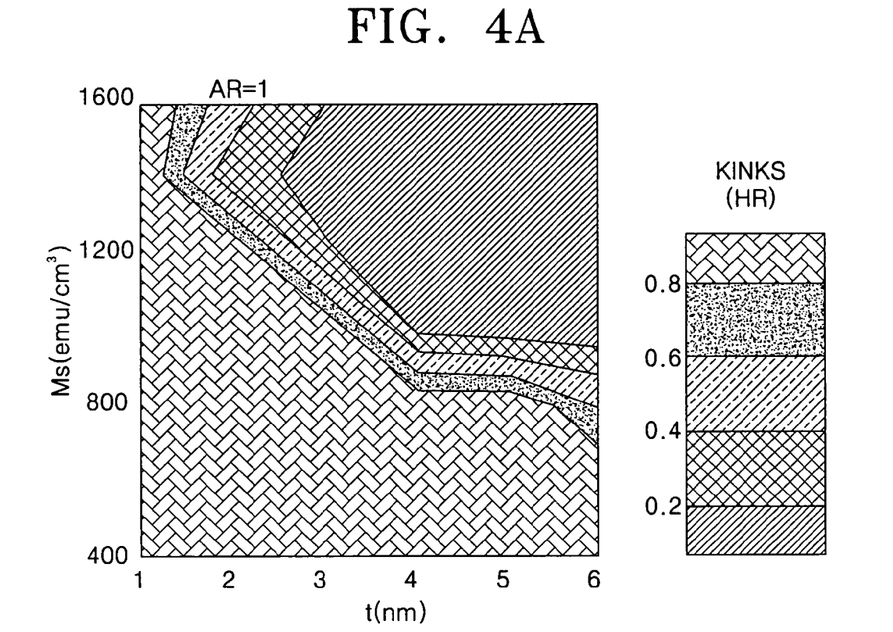
FIGS. 4A through 4E are diagrams showing distribution of Hc2/Hc1 (HR) according to a thickness (t) and a saturation magnetization (Ms) of a free layer at a predetermined aspect ratio (AR)

Referring to FIG. 4A, when the AR is 1, if the t is a range of 4 to 5 nm, the Ms must be about 900 emu/cm$^3$ or less to reach the HR of 0.8 or more. As the t reduces to less than 4 nm, the maximum value of the Ms for reaching the HR of 0.8 or more increases. If the Ms is 1,200 emu/cm$^3$ or less at the t of 2.5 nm, the Ms of 0.8 or more is obtained.

Figure 4B:
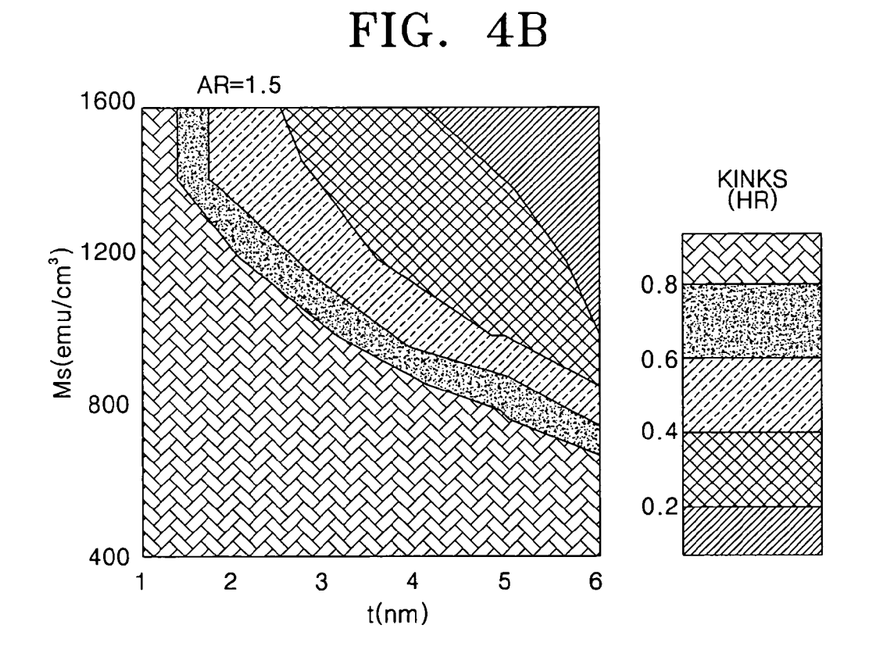

Referring to FIG. 4B, when the AR is 1.5, if the t is 5 nm, the HR of 0.8 or more is obtained at the Ms of 800 emu/cm$^3$ or less. As the t decreases, the maximum value of the Ms for reaching the HR of 0.8 or more increases.

Figure 4C:
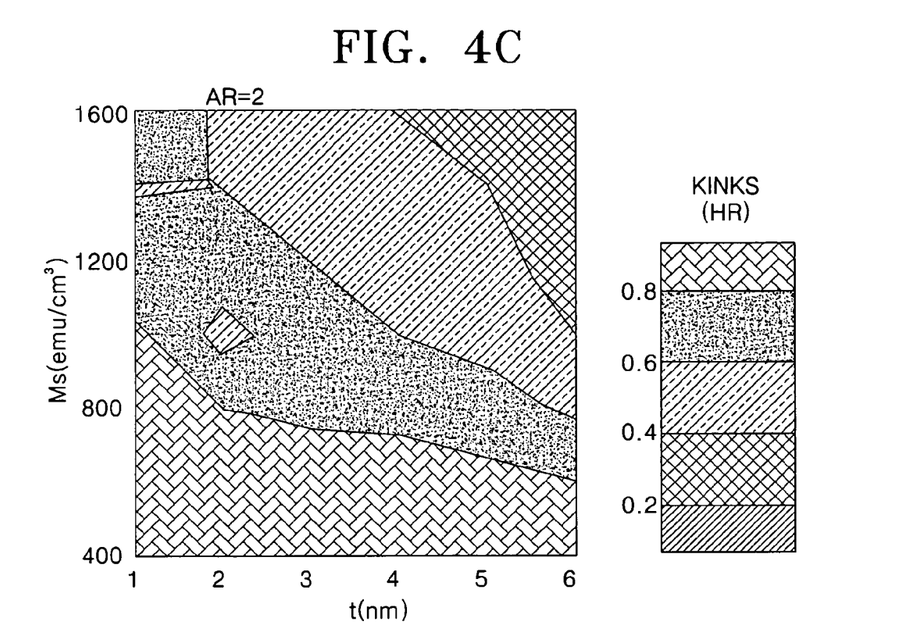

Referring to FIG. 4C, when the AR is 2, if the t is 5 nm, the Ms must be about 800 emu/cm$^3$ or less to reach the HR of 0.8 or more. As the t reduces to less than 5 nm, the maximum value of the Ms for reaching the HR of 0.8 or more increases.

Figure 4D:
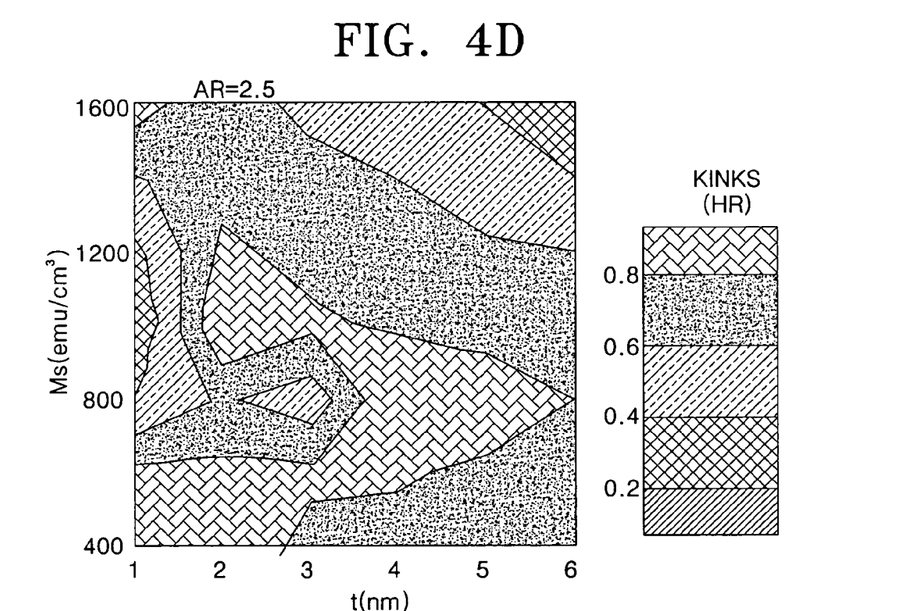

Referring to FIG. 4D, when the AR is 2.5, the HR of 0.8 or more is distributed in a zone of the t of 2.8 nm or less and the Ms of 600 emu/cm$^3$ or less. However, since the HR of 0.8 or more is irregularly observed in remaining zones, it is difficult to appropriately set the specification of an MRAM cell.

Figure 4E:
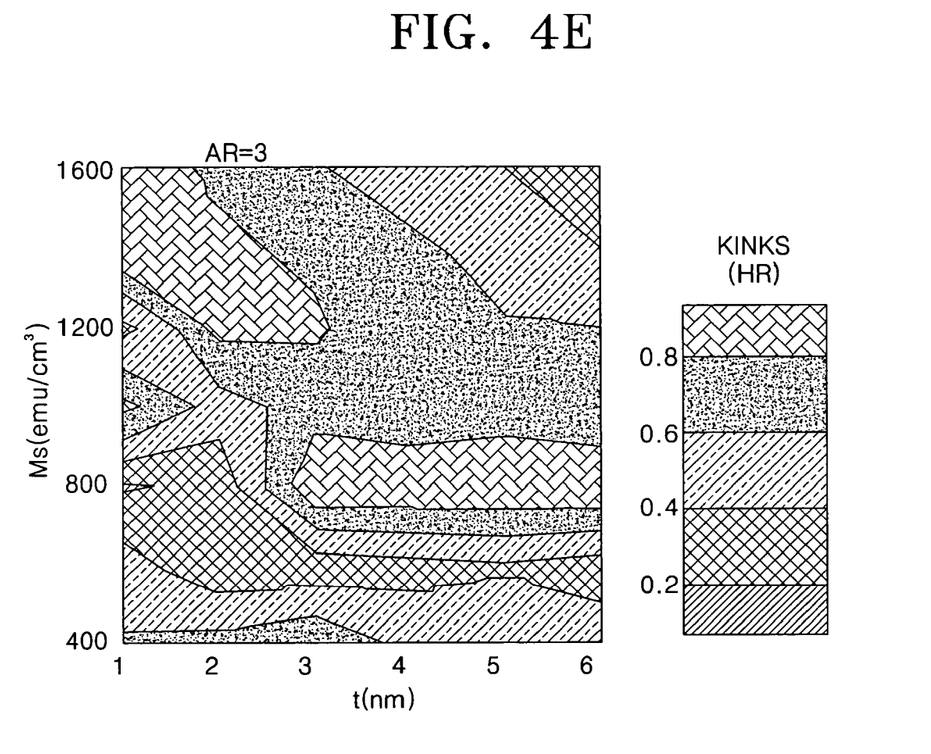

Referring to FIG. 4E, when the AR is 3, the HR of 0.8 or more is locally observed in an island form. For this reason, it is difficult to appropriately set the specification of an MRAM cell.

It can be seen from the results of FIGS. 4A through 4E that it is preferable to form an MRAM cell to the AR of 2 or less, the t of 5 nm or less, and the Ms of 800 emu/cm$^3$ or less to reach the HR of 0.7 or more, and preferably 0.8 or more.

FIGS. 5A through 5E are diagrams showing distribution of a magnetic field (Hsw) for full switching according a thickness (t) and a saturation magnetization (Ms) of a free layer at a predetermined aspect ratio (AR). A reference value of a magnetic field (Hsw) for significant full switching is 150 Oe. An MRAM cell has the Hsw of less than 150 Oe means that the MRAM cell can carry out switching even at a low driving voltage.

Referring to FIGS. 5A through 5E, similar to in FIGS. 4A through 4E, when the AR is 2.5 or 3, the Hsw larger than 150 Oe is mainly observed irrespective of the t and Ms. On the other hand, in an MRAM cell with the AR of 2 or less, if the t is 5 nm or less and the Ms is 800 emu/cm$^3$ or less, the Hsw of 150 Oe or less is stably obtained. That is, as the AR decreases, the Hsw decreases. Therefore, driving can be carried out even at a low driving voltage.

Figure 5A:
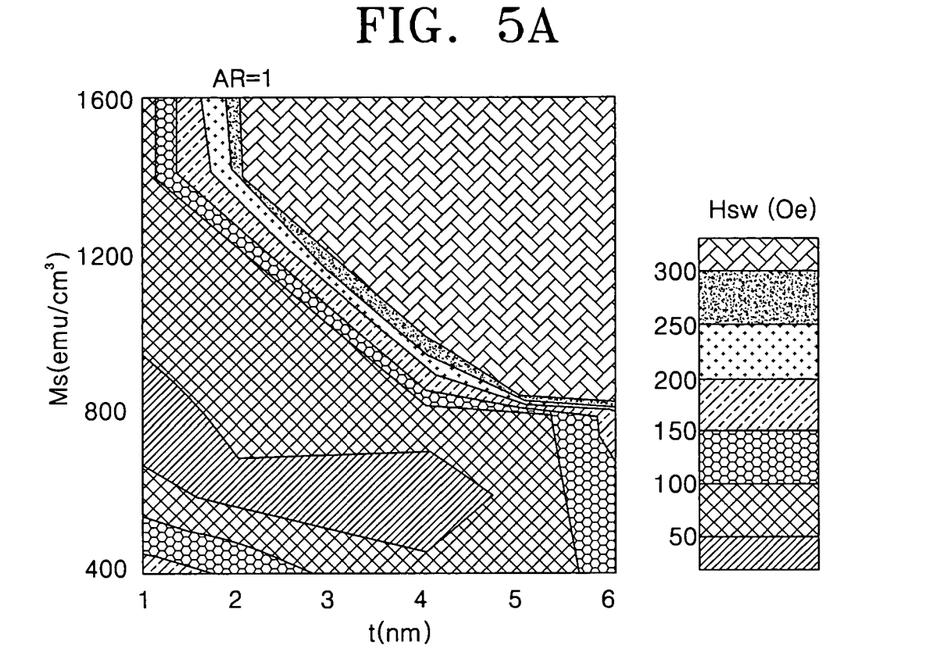
FIGS. 5A through 5E are diagrams showing distribution of a magnetic field (Hsw) for full switching according a thickness (t) and a saturation magnetization (Ms) of a free layer at a predetermined aspect ratio (AR)
Figure 5B:
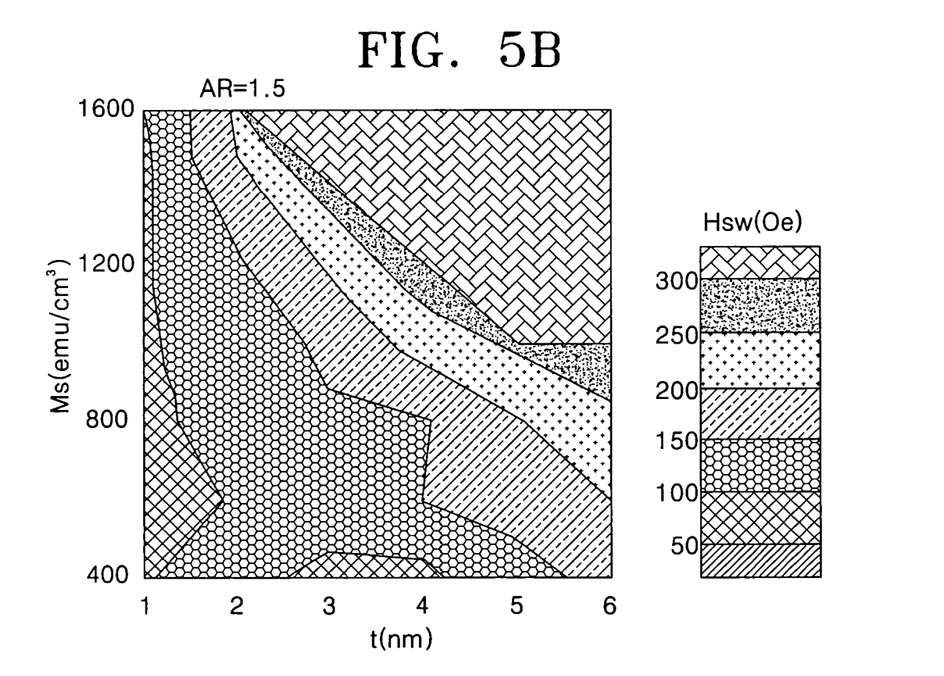
Figure 5C:
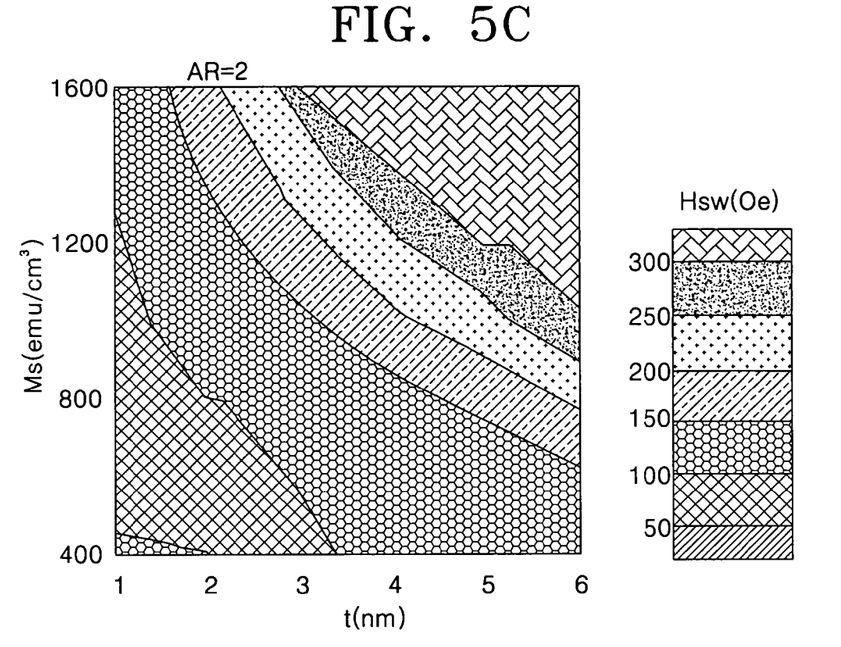
Figure 5D:
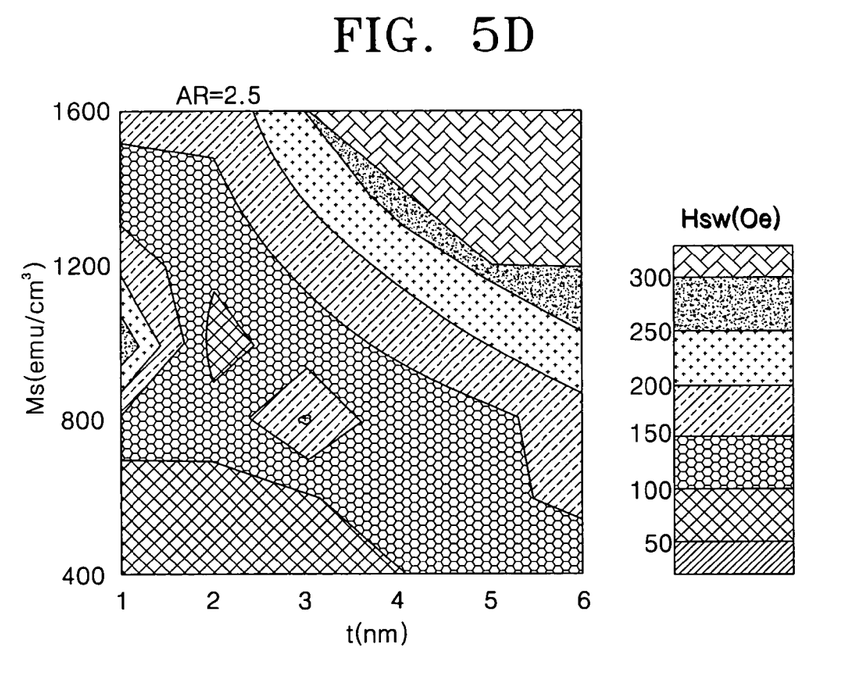
Figure 5E:
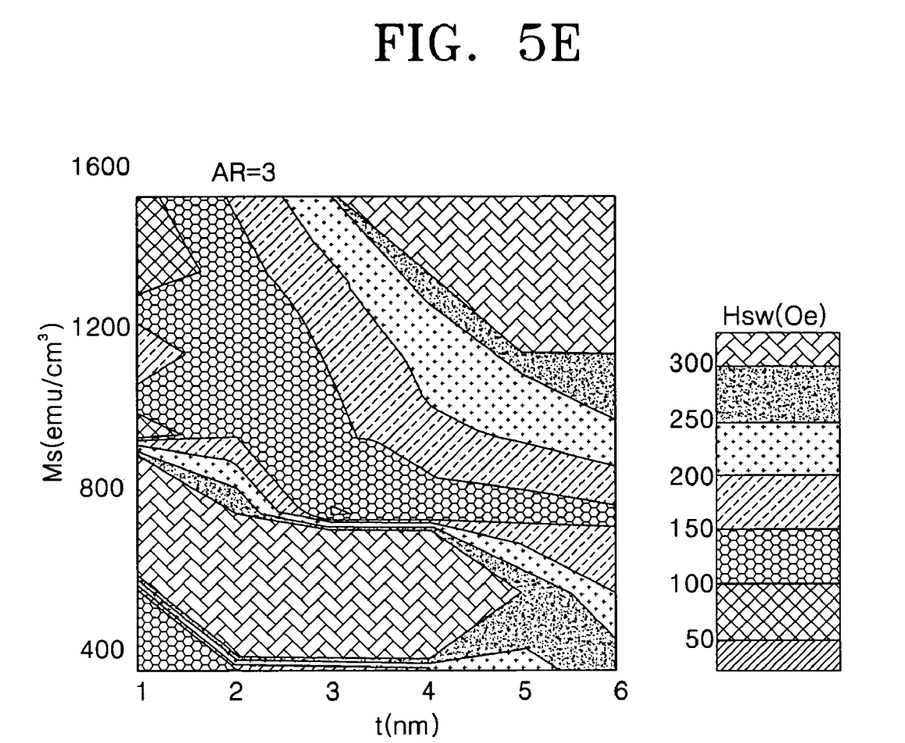
Figure 7A:
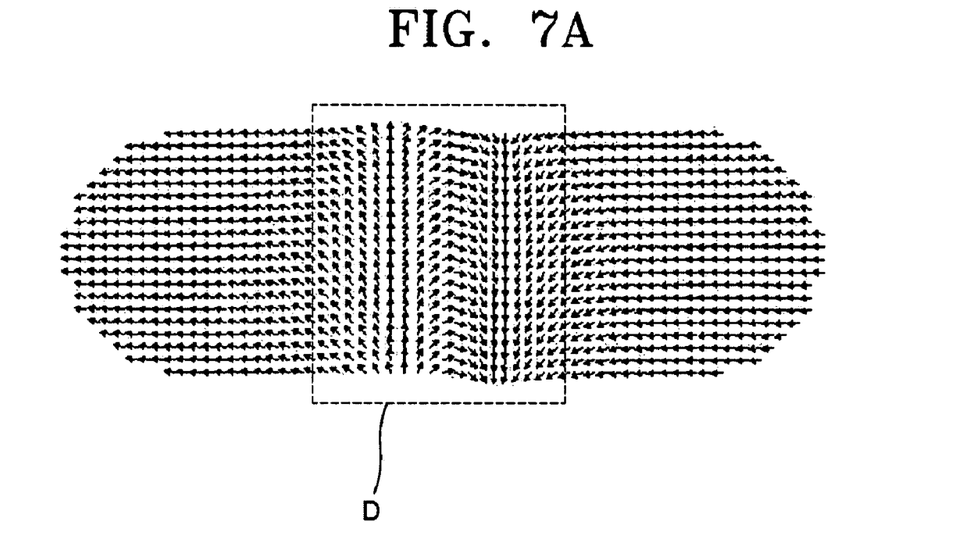
FIG. 7A is a schematic view of a 360 degrees domain wall structure of a magnetic domain.
Figure 7B:
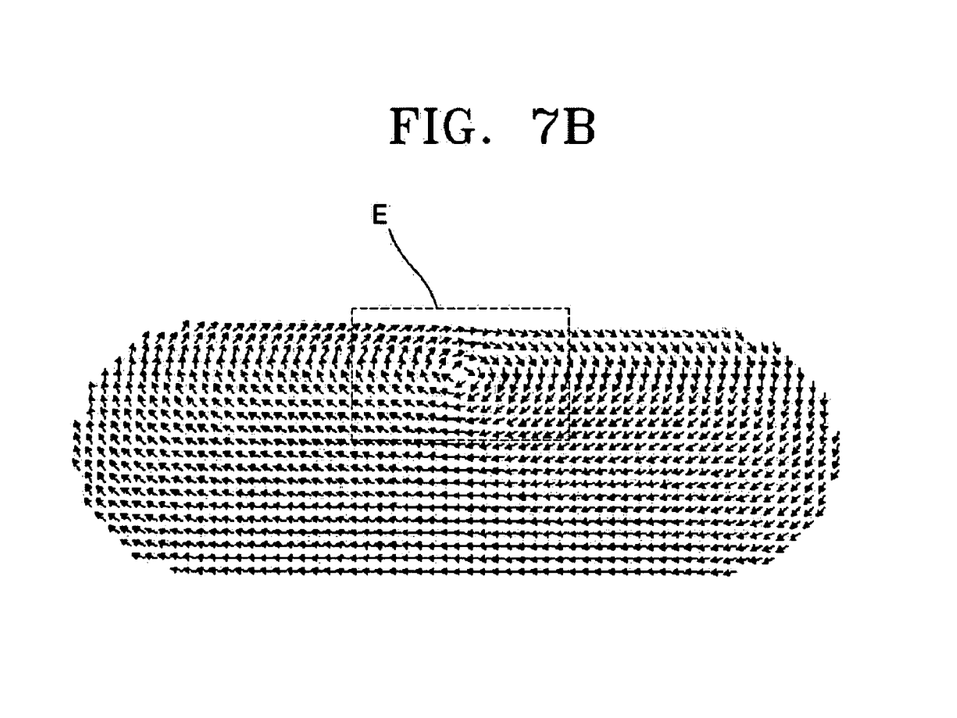
FIG. 7B is a schematic view of a magnetic vortex structure of a magnetic domain.

As shown in FIGS. 4E and 5E, when the AR is 3, if the t is 5 nm or more and the Ms is 800 emu/cm$^3$ or more (upper right), the HR is 0.6 or less and the Hsw is 150 Oe or more. This can be explained by local creation of kinks in an MRAM cell, as shown in FIG. 7B. On the other hand, if the AR has a large value such as 3 or 2.5, and the t and Ms have small values (lower left), 360 degrees domain walls are generated in some domains, as shown in FIG. 7A. As a result, kinks are created by wall pinning, thereby decreasing the HR value.

Meanwhile, referring to FIGS. 4A through 4C and 5A through 5C, if the AR is 2 or less, the t is 5 nm or less, and the Ms is 800 emu/cm$^3$ or less, a wide kink-free zone is observed (see lower left of the figures). In an MRAM cell with the AR of 2 or less, the t of 5 nm or less, and the Ms of 800 emu/cm$^3$ or less, there are no kinks that lead to generation of 360 degrees domain walls. This may be because a kink-free zone does not have a predetermined magnetization mass (Ms×t) required for appearance of kink creation factors such as vortex.

Figure 6:
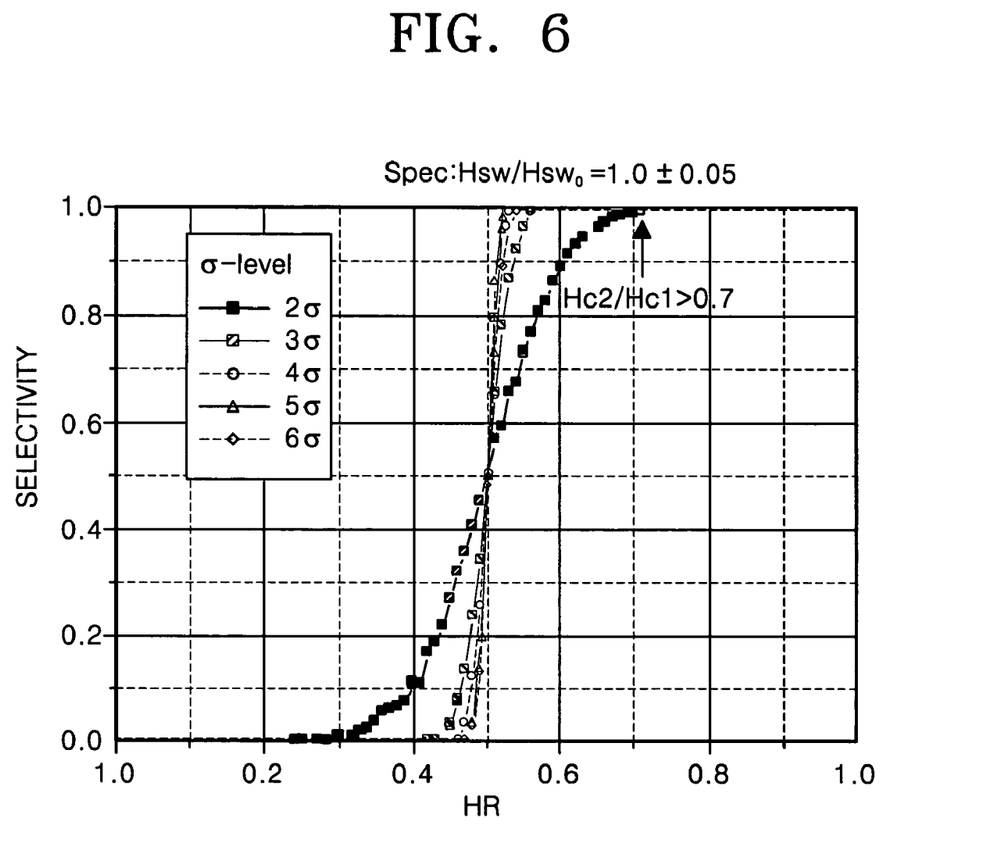
FIG. 6 is a graph showing a change in selectivity according to process capability and HR in fabrication of an MRAM cell according to an embodiment of the present invention.

FIG. 6 is a graph showing a change in selectivity according to process capability and HR in fabrication of an MRAM cell according to an embodiment of the present invention. Referring to FIG. 6, 2σ indicates minimum process capability and 6σ indicates maximum process capability. Even when the process capability is as low as 2σ, so long as the HR is larger than 0.7, selectivity equal to 1 can be obtained.

An MRAM cell with the specification of AR≦2, t<5 nm, and Ms<800 emu/cm$^3$ according to an embodiment of the present invention exhibits the HR of 0.7 or more, as shown in FIGS. 4A through 4C. Therefore, an MRAM cell according to an embodiment of the present invention can exhibit high selectivity regardless of process capability.

FIG. 7A is a schematic view of a 360 degrees domain wall structure of a magnetic domain and FIG. 7B is a schematic view of a magnetic vortex structure of a magnetic domain. Generally, it is assumed that appearance of kinks in resistance-magnetic field curves are caused by a domain wall or a magnetic vortex in an MRAM cell.

An MRAM cell according to an embodiment of the present invention is formed with the specification of $AR \leq 2$, $t \leq 5$ nm, and $Ms \leq 800$ emu/cm$^3$. As a result, a domain wall (D) and a magnetic vortex (E) of a magnetic domain are annihilated, which makes it possible to prevent appearance of kinks in magneto-resistance characteristics.

Figure 8:
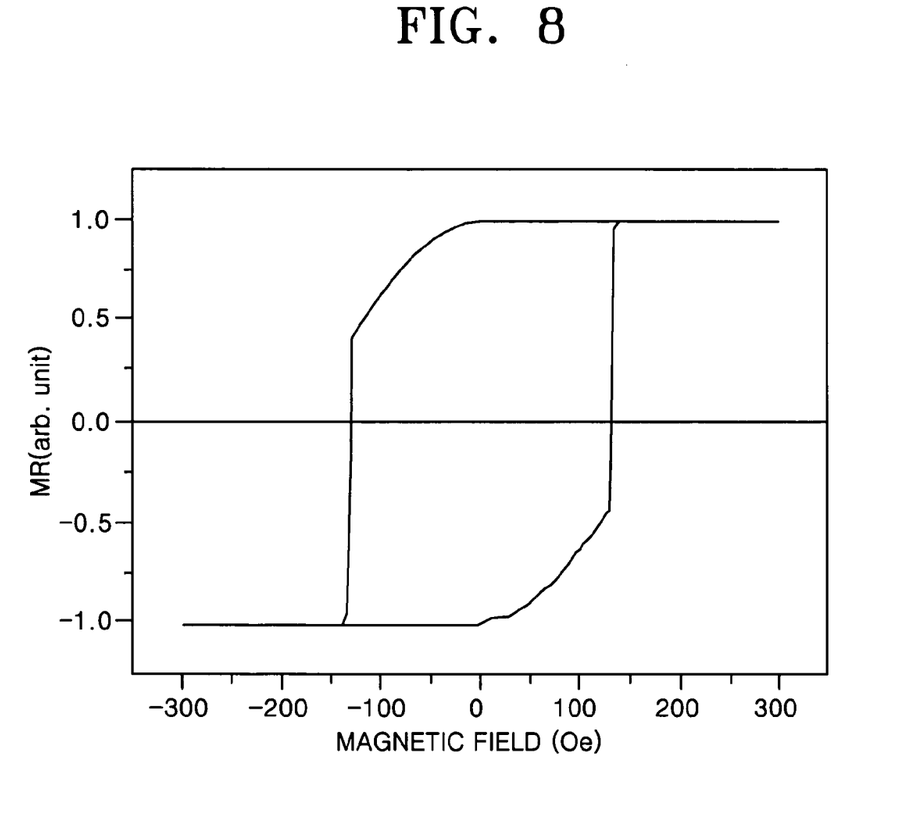
FIG. 8 is a simulation graph of a resistance-magnetic field curve in an MRAM cell formed with the specification of AR=1.5, t=3 nm, and Ms=600 emu/cm$^3$ according to an embodiment of the present invention.

FIG. 8 is a simulation graph of a resistance-magnetic field curve in an MRAM cell formed with the specification of $AR=1.5$, $t=3$ nm, and $Ms=600$ emu/cm$^3$ according to an embodiment of the present invention. Referring to FIG. 8, it can be seen that no kinks are observed, when compared to the resistance-magnetic field curve of a conventional MRAM cell. That is, an MRAM cell according to an embodiment of the present invention has kink-free, resistance-magnetic field characteristics, thereby exhibiting high selectivity regardless of process capability.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetoresistive random access memory comprising:
   a first magnetic layer of which the direction of a magnetic vector is fixed;
   a second magnetic layer which is positioned in parallel with the first magnetic layer and of which the direction of a magnetic vector is reversible; and
   a non-magnetic layer interposed between the first and second magnetic layers,
   the second magnetic layer having an aspect ratio of 2 or less, a thickness of 4 nm or less, and a saturation magnetization of 800 emu/cm$^3$ or less.

2. The magnetoresistive random access memory according to claim 1, wherein the second magnetic layer has an aspect ratio of 1.5 or less.

3. The magnetoresistive random access memory according to claim 1, wherein the second magnetic layer has an aspect ratio of 1.4 or less.

4. The magnetoresistive random access memory according to claim 1, wherein the second magnetic layer has an aspect ratio of 1.3 or less.

5. The magnetoresistive random access memory according to claim 1, wherein the second magnetic layer has an aspect ratio of 1.2 or less.

6. The magnetoresistive random access memory according to claim 1, wherein the second magnetic layer has an aspect ratio of 1.1 or less.

7. The magnetoresistive random access memory according to claim 1, wherein the second magnetic layer has an aspect ratio of 1.0 or less.

8. The magnetoresistive random access memory according to claim 1, wherein the second magnetic layer has a thickness of 3 nm or less.

9. The magnetoresistive random access memory according to claim 1, wherein the second magnetic layer has a saturation magnetization of 700 emu/cm$^3$ or less.

10. The magnetoresistive random access memory according to claim 2, wherein the second magnetic layer has a saturation magnetization of 700 emu/cm$^3$ or less.

11. The magnetoresistive random access memory according to claim 8, wherein the second magnetic layer has a saturation magnetization of 700 emu/cm$^3$ or less.

12. The magnetoresistive random access memory according to claim 1, wherein the second magnetic layer has a saturation magnetization of 600 emu/cm$^3$ or less.

13. The magnetoresistive random access memory according to claim 2, wherein the second magnetic layer has a saturation magnetization of 600 emu/cm$^3$ or less.

14. The magnetoresistive random access memory according to claim 8, wherein the second magnetic layer has a saturation magnetization of 600 emu/cm$^3$ or less.

15. The magnetoresistive random access memory according to claim 1, wherein the first and second magnetic layers are formed in a multilayer structure.

16. The magnetoresistive random access memory according to claim 1, wherein the non-magnetic layer is formed in a multilayer structure.

17. The magnetoresistive random access memory according to claim 1, wherein the non-magnetic layer is made of a conductive material.

* * * * *